United States Patent
Guerra et al.

(10) Patent No.: US 12,373,208 B1
(45) Date of Patent: Jul. 29, 2025

(54) PROCESSOR INSTRUCTION FOR DYNAMIC FLOATING POINT EXPONENT EXTRACTION

(71) Applicant: QUALCOMM Incorporated, San Diego, CA (US)

(72) Inventors: Diego Andres Guerra, Austin, TX (US); Eric Wayne Mahurin, Austin, TX (US); Butchi Venkata Chaitanya Akondi, Austin, TX (US); Albert Danysh, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/604,800

(22) Filed: Mar. 14, 2024

(51) Int. Cl.
*G06F 9/30* (2018.01)

(52) U.S. Cl.
CPC .............................. *G06F 9/30014* (2013.01)

(58) Field of Classification Search
CPC .. G06F 7/544; G06F 9/30014; G06F 9/30025; G06F 9/30036; G06F 17/10; G06F 9/3001
See application file for complete search history.

(56) References Cited

U.S. PATENT DOCUMENTS

| | | | | |
|---|---|---|---|---|
| 4,843,567 A | * | 6/1989 | Mukherjee | G06N 5/01 700/89 |
| 6,529,928 B1 | * | 3/2003 | Resnick | G06F 7/485 708/505 |
| 2013/0103732 A1 | * | 4/2013 | Asanaka | G06F 7/49915 708/512 |
| 2014/0372493 A1 | * | 12/2014 | Peterson | G06F 7/544 708/503 |
| 2017/0308357 A1 | * | 10/2017 | Bekas | G06F 7/556 |
| 2021/0081172 A1 | * | 3/2021 | Nagabhushanamgari | G06F 7/548 |
| 2022/0405096 A1 | * | 12/2022 | Mu | G06F 9/30025 |
| 2024/0296048 A1 | * | 9/2024 | Bruguera | G06F 9/3001 |
| 2024/0394018 A1 | * | 11/2024 | Hall | G06F 7/485 |

* cited by examiner

*Primary Examiner* — Jacob Petranek
(74) *Attorney, Agent, or Firm* — Patterson + Sheridan LLP

(57) ABSTRACT

Certain aspects of the present disclosure provide techniques and apparatus for hardware-based floating point exponent extraction. Aspects include invoking an instruction in an instruction set architecture (ISA) associated with the one or more processors in order to extract an exponent from a floating point value. Aspects include, in response to the invoking, executing machine code of the instruction using the one or more processors to compute a floor of a base two logarithm of the floating point value to determine the exponent. Aspects include performing one or more actions using the exponent.

20 Claims, 5 Drawing Sheets

PROCESSOR INSTRUCTION FOR DYNAMIC FLOATING POINT EXPONENT EXTRACTION

INTRODUCTION

Aspects of the present disclosure relate to processor instructions for extraction of exponents from floating point values.

Advances in technology have resulted in more powerful computing devices. For example, computing devices such as laptop and desktop computers and servers, as well as wireless computing devices such as portable wireless telephones, have improved computing capabilities and are able to perform increasingly complex operations. Increased computing capabilities have also enhanced device capabilities in various other applications. For example, vehicles may include processing devices to enable global positioning system operations or other location operations, self-driving operations, interactive communication and entertainment operations, etc. Other examples include household appliances, security cameras, metering equipment, etc., that also incorporate computing devices to enable enhanced functionality, such as communication between internet-of-things (IoT) devices.

A computing device may include a processor to execute program instructions. For example, the processor may execute arithmetic instructions, such as a multiply instruction, to perform graphics processing, data encoding, or encryption, as illustrative examples. The processor may operate on various types of data, such as integers or floating point numbers.

A floating point number is typically represented by a sign bit, an exponent value, and a significand (mantissa) that consists of the significant digits of the number. There are various types of floating point formats that may be used to store floating point values, and extracting the exponent from a floating point value may involve a different process for each different type. For example, a value that is formatted as a half precision, single precision, or double precision number according to an Institute of Electronics and Electrical Engineers (IEEE) standard may have specific bits designated for storing an exponent, while other floating point formats may not correspond to such an expected pattern. Many floating point types are formatted in such a manner that extracting the exponent may involve bit manipulation. Extracting exponents from floating point values is often challenging due to such variations in format and due to the resource-intensive instructions that are generally involved in exponent extraction.

Vectors used in various processing tasks, such as machine learning, often involve large numbers of floating point values. Extracting exponents from floating point values in vectors using existing techniques is computationally expensive and complex due to format variations.

BRIEF SUMMARY

Certain aspects provide a method, comprising: invoking an instruction in an instruction set architecture (ISA) associated with the one or more processors in order to extract an exponent from a floating point value; in response to the invoking, executing machine code of the instruction using the one or more processors to compute a floor of a base two logarithm of the floating point value to determine the exponent; and performing one or more actions using the exponent.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain features of one or more aspects of the present disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
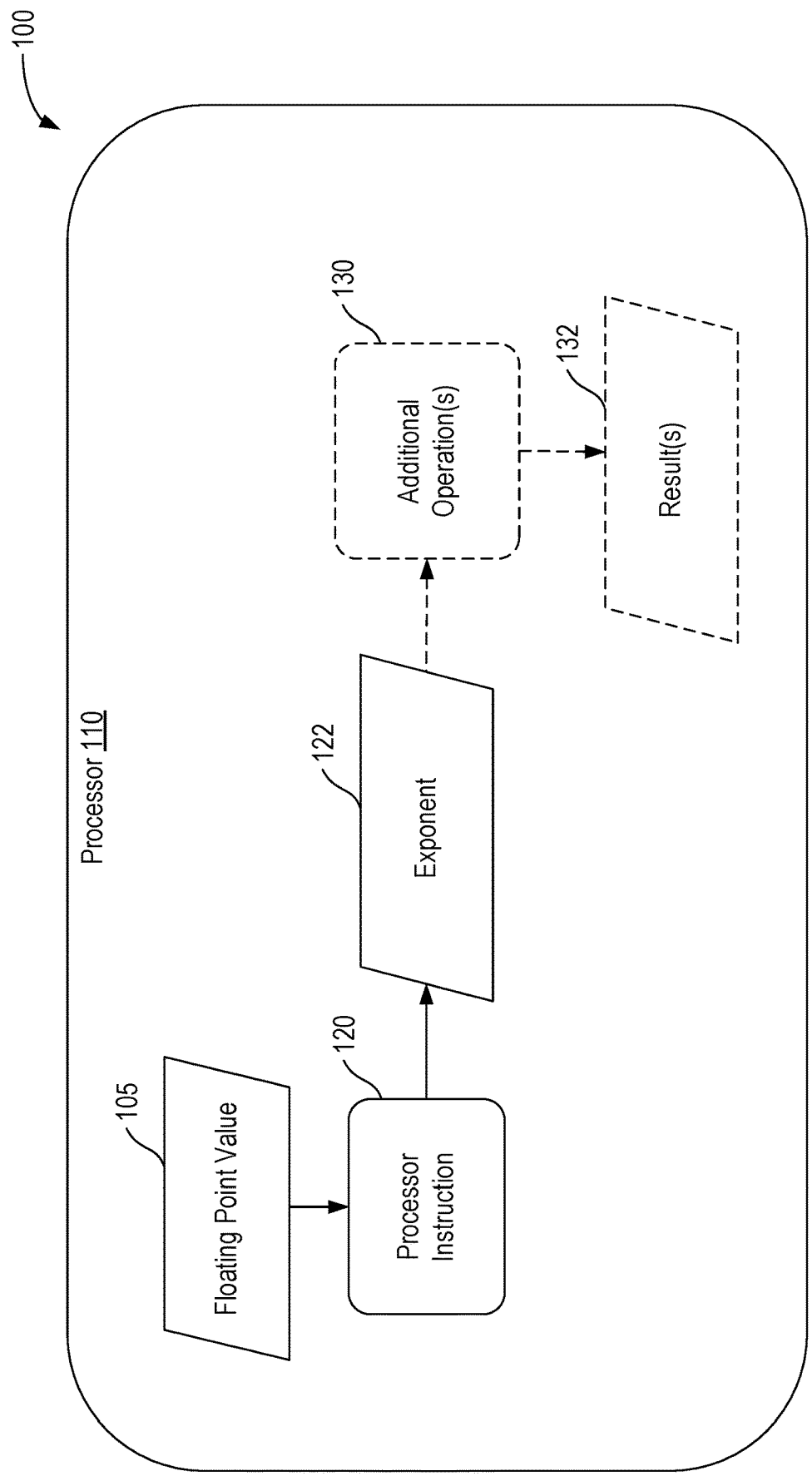
FIG. 1 illustrates an example computing environment for hardware-based floating point exponent extraction according to various aspects of the present disclosure.

Aspects of the present disclosure provide apparatuses, methods, processing systems, and computer-readable mediums hardware-based floating point exponent extraction.

Existing techniques for floating point exponent extraction generally involve bit manipulation through multiple processor instructions, and are computationally expensive. Furthermore, existing floating point exponent extraction techniques are applicable to specific floating point types or formats with particular expected bit patterns, and do not account for variations in floating point type. Accordingly, such existing techniques are generally resource-intensive and limited to particular floating point types, and may not function well in computing environments where processing and/or memory resources are limited, where speed is critical, and/or where atypical floating point types are used.

In order to enable improved floating point exponent extraction, certain aspects involve one or more specialized processor instructions for extracting exponents from floating point values. In an example, an instruction set architecture (ISA) of a processor is augmented with a set of instructions for extracting exponents from floating point values of different types. An ISA is a set of instructions that a computer processor is configured to understand and execute, and the instructions generally define operations such as mathematical computations, data movement, and logical operations. An ISA serves as an interface between hardware and software, and allows developers to write code that is executed by the processor. According to certain aspects of the present disclosure, a processor instruction for floating point exponent extraction involves computing the floor of the base two logarithm of a given floating point value. In some aspects, an instruction is configured to extract the exponent from each floating point value in a vector by computing the floor of the base two logarithm of each floating point value. Different instructions may be configured for extracting exponents from different floating point types or formats, such as for half precision IEEE-754 floating point values, single precision IEEE-754 floating point values, 16-bit qfloat values, 32-bit qfloat values, and/or the like.

A given instruction for extracting an exponent from a floating point value may comprise machine code for determining an indicated exponent value from the floating point value (e.g., based on the bits in the floating point value that are expected to correspond to the exponent), determining a count of leading zeros in the floating point value, and then subtracting the count of leading zeros from the indicated exponent value to determine the exponent. Thus, techniques described herein may determine the exponent in a resource-efficient manner that accounts for variations in floating point type by removing leading zeros.

Aspects of the present disclosure provide multiple technical improvements with respect to existing techniques for extracting an exponent from a floating point value in a computer. For example, by providing a single processor instruction that performs exponent extraction through computing a floor of a base two logarithm of a floating point value, rather than performing bit manipulation through multiple instructions as in existing techniques, techniques described herein reduce computing resource utilization and thereby improve the functioning of computing devices involved while accurately extracting exponents from floating point values. These improvements are particularly advantageous when large numbers of floating point values are processed, such as in the context of machine learning in which vectors with large numbers of floating point values are involved in many computations. Furthermore, by providing different instructions for different floating point types and/or by accounting for any leading zeros in floating point values, techniques described herein allow for exponents to be extracted from a variety of different floating point types in an accurate and efficient manner. Additionally, by providing a processor instruction that performs extraction of exponents from all floating point values in a vector at the hardware level, aspects of the present disclosure provide further resource-efficiency, thereby improving the functioning of computing devices and applications that involve vector-based computations.

Example Computing Environment for Hardware-Based Floating Point Exponent Extraction FIG. 1 illustrates an example computing environment 100 in which hardware-based floating point exponent extraction may be performed according to various aspects of the present disclosure. Computing environment 100 includes a processor 110, which generally represents a central processing unit (CPU) or other processing device that is configured to execute instructions to perform various computing operations. For example, processor 110 may be associated with an instruction set architecture (ISA) including instructions comprising machine code for performing various types of operations. The ISA of processor 110 may include a processor instruction 120 for extracting an exponent 122 from a floating point value 105.

Processor instruction 120 may be invoked in order to perform floating point exponent extraction, which may cause machine code to be executed. In some aspects, floating point value 105 corresponds to a particular floating point type or format, and processor instruction 120 is associated with that particular floating point type or format. For example, separate processor instructions may be available for different floating point types or formats, and processor instruction 120 may be selected based on the type or format of floating point value 105.

Processor instruction 120 may include machine code that determines a floor of a base two logarithm of floating point value 105, which results in the integer part of the base two logarithm of floating point value 105. In some aspects, processor instruction 120 involves computing the floor of the base two logarithm of the absolute value of floating point value 105. For example, processor instruction may extract an exponent i from a floating point value x using the following formula:

$$i = \text{floor}(\log_2(|x|)) = i\log_2(|x|),$$

where $i\log_2(|x|)$ refers to the integer part of the base two logarithm of the absolute value of x.

In some aspects, computing the integer part of the base two logarithm of the absolute value of x involves determining an indicated exponent in x based on bits that are expected to indicate an exponent (e.g., in a particular bit pattern associated with one or more types of floating point values), determining a count of leading zeros in x, and then subtracting the count of leading zeros from the indicated exponent to determine the exponent. Such a technique is described in more detail below with respect to FIG. 2.

In certain aspects, processor instruction 120 may return particular values as exponent 122 in certain corner cases in order to avoid system errors. For example, if the floating point value 105 is zero, processor instruction 120 may return negative one as the exponent 122. In another example, if the floating point value 105 is infinity, processor instruction 120 may return a maximum positive word or half word value (e.g., depending on the bit width of floating point value 105) minus one as the exponent 122. In yet another example, if the floating point value 105 is a not a number (NaN) value, processor instruction 120 may return a maximum positive word or half word value (e.g., depending on the bit width of floating point value 105) as the exponent 122.

Exponent 122 may be used to perform one or more additional operations 130 in order to produce one or more results 132. For example, additional operation(s) 130 may involve processing a vector of which floating point value 105 is a part through one or more layers of a machine learning model, or may involve any other type of processing of a floating point value. Result(s) 132 may include one or more machine learning parameters, inferences, and/or other values that may be determined based on exponents extracted from floating point values.

Processor instruction 120 provides a hardware-level solution for efficiently extracting exponents from floating point values of various types that accounts format variations (e.g., through subtracting leading zeros) and reduces time and computing resource utilization through reduction of the number of instructions and/or operations involve in extracting an exponent from a floating point value.

Example Computation for Hardware-Based Floating Point Exponent Extraction

Figure 2:
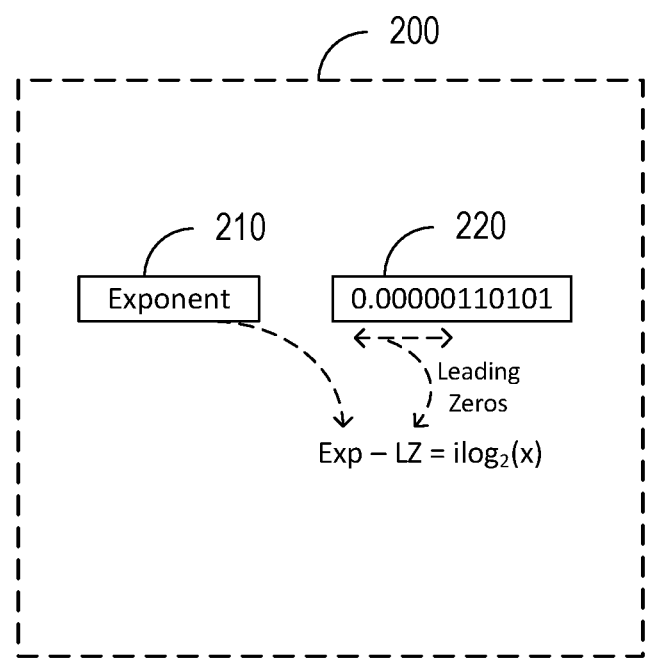
FIG. 2 illustrates an example of hardware-based floating point exponent extraction according to various aspects of the present disclosure.

FIG. 2 is a diagram depicting an example computation 200 for hardware-based floating point exponent extraction. In particular, computation 200 represents an example implementation of processor instruction 120 of FIG. 1.

Computation 200 involves a type normalization of a floating point value x in cases where x is not already normalized, so that the exponent can be extracted regardless of whether x is in a normalized format.

Floating point values are typically represented by a sign bit, an exponent value, and a significand (mantissa or fraction) that consists of the significant digits of the number. May floating point types or formats involve a bit pattern that can be used to determine which bits indicate the sign, the exponent, and the significand. For example, single precision IEEE-754 floating point values may correspond to a pattern in which the first bit is a sign bit, the next 8 bits indicate the exponent, and the next 23 bits indicate the significand. A floating point value is normalized, for example, when the integer part of its significand is constrained to being exactly 1 while its fraction part is not constrained in this manner. When a single precision IEEE-754 floating point value is normalized, floor ($\log_2$ (|x|)) can be determined by identifying the 8 bits that are expected to indicate the exponent. In such a case, there should not be any leading zeros in the floating point value. However, when a single precision IEEE-754 floating point value is not normalized, determining floor ($\log_2$ (|x|)) may be more complex, and there may be leading zeros in the floating point value. Furthermore, other floating point types or formats may have this complexity (e.g., normalization versus non-normalization) in addition to differing bit patterns, some of which may not be known to software developers working with such floating point values.

Accordingly, computation 200 involves, if a floating point value 220 is not normalized, normalizing the value (e.g., by scaling the value to between 1 and 2, or between ½ and 1, times 2 to the power of exponent) at the hardware level. In particular, computation 200 involves determining a count of leading zeros (e.g., insignificant bits) in a floating point value x, determining the indicated exponent 210 of the floating point value x (e.g., based on the bits that are expected to indicate the exponent for the format or type of the floating point value), and subtracting the count of leading zeros (or otherwise removing the leading zeros) from the indicated exponent 210 in order to compute floor ($\log_2$ (|x|)) or ilog$_2$ (|x|). Leading zeros are illustrated in floating point value 220, which comprises the value 0.00000110101 including 6 leading zeros. If the count of leading zeros is zero, then the result of floor ($\log_2$ (|x|)) or ilog$_2$ (|x|) is the indicated exponent 210. If the count of leading zeros is not zero, then the result of floor ($\log_2$ (|x|)) or ilog$_2$ (|x|) is the indicated exponent 210 minus the count of leading zeros.

It is noted that while performing normalization would usually involve shifting the floating point value by the count of leading zeros, a shift may not be performed in computation 200 because only the exponent is needed. As such, computation 200 may involve only subtracting the count of leading zeros from the indicated exponent to produce the result of floor ($\log_2$ (|x|)) or ilog$_2$ (|x|).

Subtracting the count of leading zeros from the indicated exponent may allow techniques described herein to account for non-normalized floating point values in a variety of different formats or types.

Example Pipeline for Hardware-Based Vector Floating Point Exponent Extraction

Figure 3:
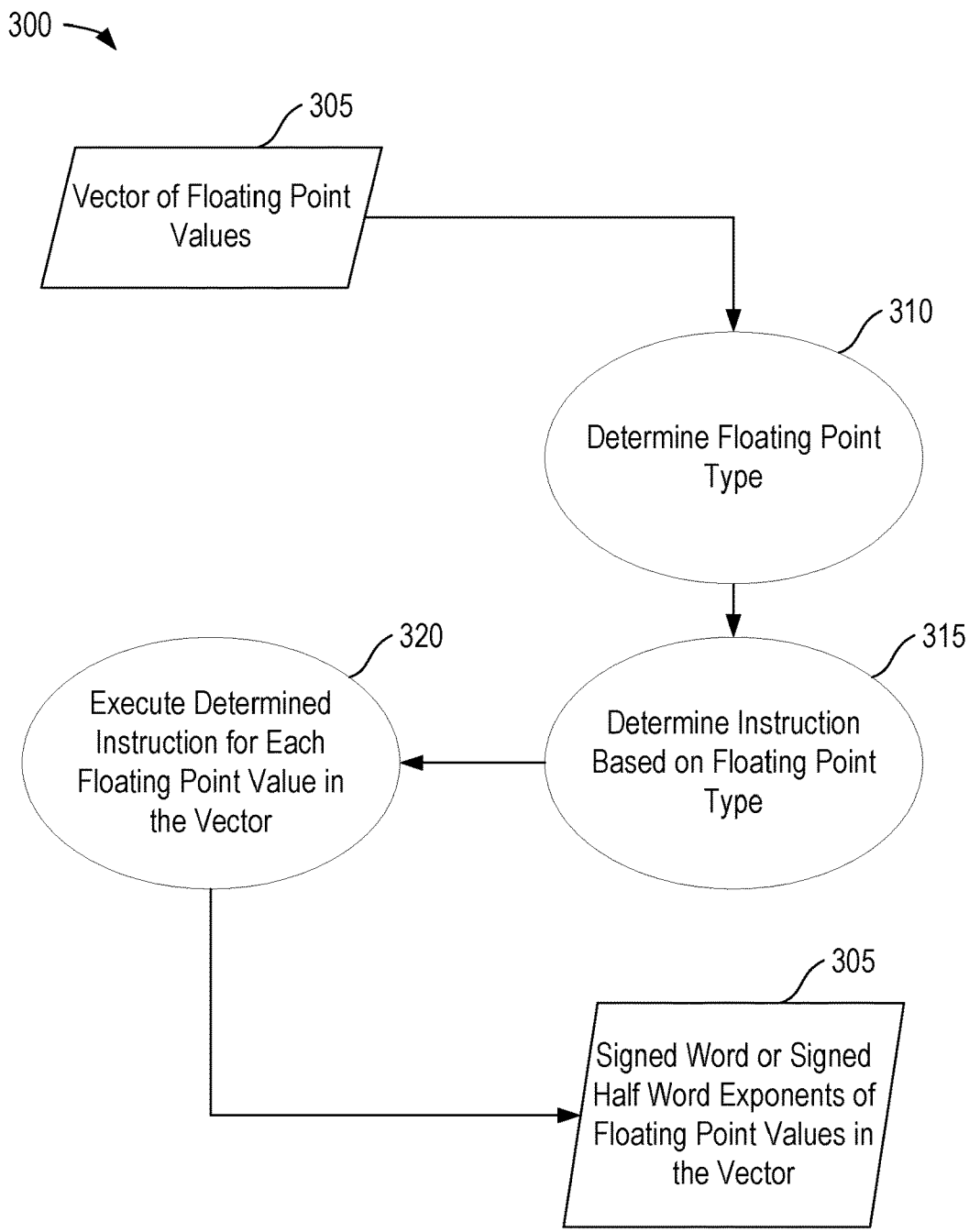
FIG. 3 illustrates an example pipeline for hardware-based vector floating point exponent extraction according to various aspects of the present disclosure.

FIG. 3 is a diagram depicting an example pipeline 300 for hardware-based vector floating point exponent extraction. Pipeline 300 may, for example, represent operations performed by a processor such as processor 110 of FIG. 1, and may involve computations corresponding to computation 200 of FIG. 2 for each floating point value in a given vector.

In pipeline 300, a vector of floating point values 305 comprises a plurality of floating point values, such as representing a feature input to a machine learning model or another type of information. At step 310, a floating point type of the vector of floating point values 305 is determined. For example, step 310 may comprise analyzing metadata associated with the vector of floating point values 305 or a structure of these floating point values in order to determine the floating point type or format.

At step 315, a processor instruction is determined based on the floating point type that was determined at step 310. For example, there may be a plurality of different processor instructions in an ISA associated with the processor for extracting an exponent from a floating point value, each of the processor instructions corresponding to a different floating point type. The processor instruction that corresponds to the floating point type of the vector of floating point values 305 may be selected.

At step 320, the processor instruction that was determined at step 315 is executed for each floating point value in the vector of floating point values 305. In one example implementation, the processor instruction is for extracting exponents from vectors of floating point values and, when executed, the processor instruction goes through each respective floating point value in the vector and computes the floor of the base two logarithm of the absolute value of the respective floating point value (e.g., which may involve subtracting a count of leading zeros from the indicated exponent of the respective floating point value, as described above with respect to FIG. 2).

For example, a processor instruction vilog$_2$ (Vu.qf32) for extracting exponents Vd.w [i] from a vector Vu.qf32 of floating point values of type qfloat32 may be represented with the following pseudocode:

vilog$_2$ (Vu.qf32)=
    for (i=0; i<vecsize-1; i++)
    {
    Vd.w[i]=floor ($\log_2$ (abs (Vu.qf32 [i])));
    }, where vecsize is the number of floating point values in the vector Vu.qf32 and abs ( ) is a function that computes an absolute value of the input.

Similar processor instructions may also be provided for vectors of floating point values of different types, such as single-precision or half precision IEEE-754, qfloat16, and/or the like.

The output 305 of step 320 includes signed word or half word exponents of the floating point values in the vector of floating point values 305, depending on a bit width of the floating point values (e.g., 16 or 32 bits). Techniques described herein may also be used for different bit lengths, such as 64 bit floating point values (e.g., double precision).

Providing a single processor instruction for extracting exponents from all floating point values in a vector corresponding to a given floating point type allows for resource-efficient exponent extraction from vectors in such a manner that a developer may invoke the instruction without knowing details of the particular floating point format.

Example Method for Hardware-Based Floating Point Exponent Extraction

Figure 4:
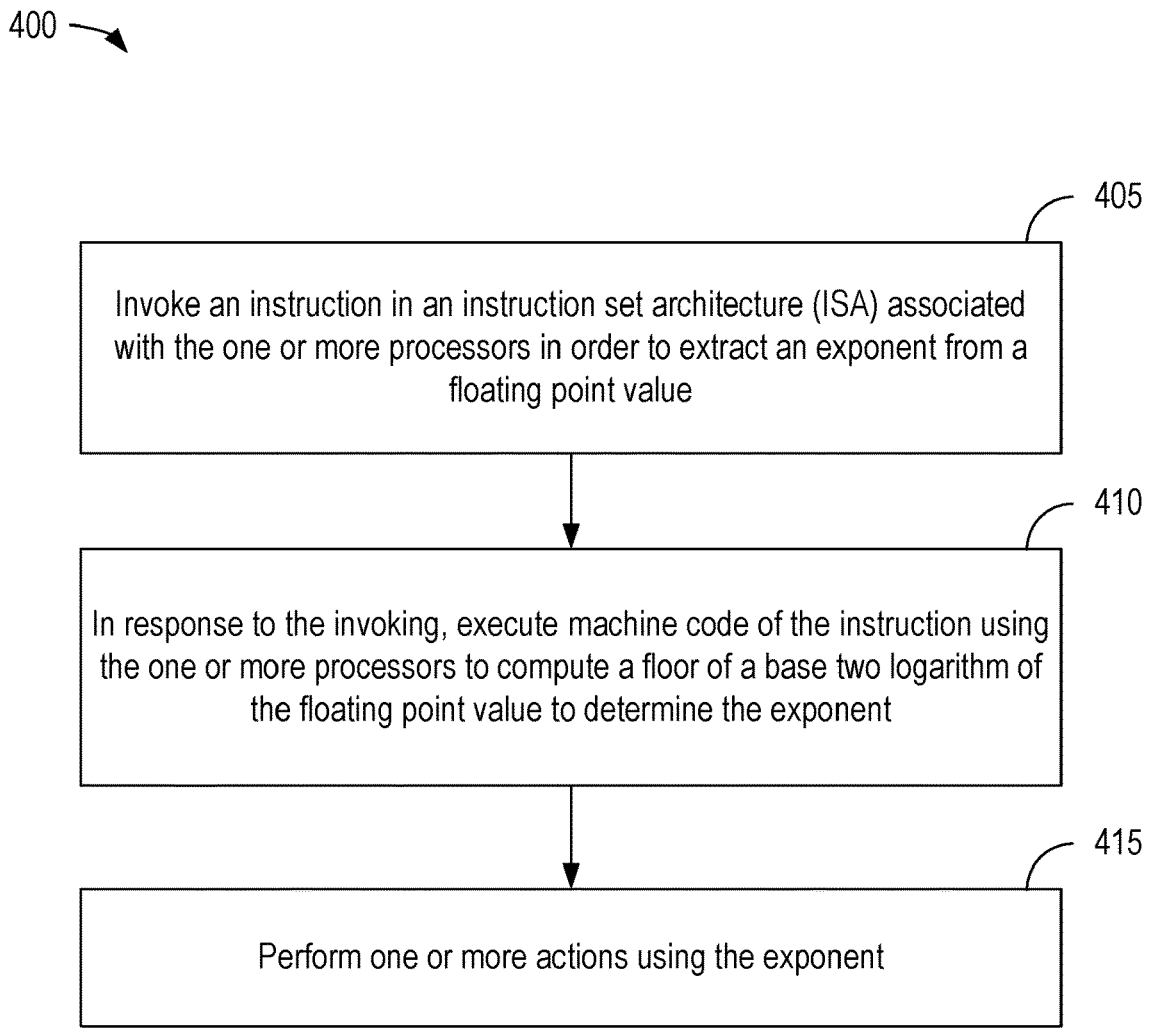
FIG. 4 is a flow diagram depicting an example method for hardware-based floating point exponent extraction according to various aspects of the present disclosure.

FIG. 4 is a diagram depicting an example method 400 for hardware-based floating point exponent extraction, according to various aspects of the present disclosure. For example, method 400 may be performed by one or more components of processor 110 of FIG. 1 and/or by a processing system such as processing system 500 of FIG. 5, described below. Method 400 may relate to one or more of computation 200 of FIG. 2 and pipeline 300 of FIG. 3.

Method 400 begins at block 405, with invoking an instruction in an instruction set architecture (ISA) associated with the one or more processors in order to extract an exponent from a floating point value.

Method 400 continues at block 410, with, in response to the invoking, executing machine code of the instruction using the one or more processors to compute a floor of a base two logarithm of the floating point value to determine the exponent.

Method 400 continues at block 415, with performing one or more actions using the exponent.

In some aspects, the computing of the floor of the base two logarithm of the floating point value comprises determining a count of leading zeros in the floating point value, determining an indicated exponent value from the floating point value, and determining the exponent based on subtracting the count of leading zeros from the indicated exponent value.

In certain aspects, the computing of the floor of the base two logarithm of the floating point value comprises computing the floor of the base two logarithm of an absolute value of the floating point value.

In some aspects, the floating point value is a component of a vector, and the method further comprises invoking the instruction in the ISA associated with the one or more processors in order to extract respective exponents from respective floating point values that are other components of the vector.

In certain aspects, the exponent is a signed word or signed half word value depending on a bit width of the floating point value.

In some aspects, the instruction corresponds to a particular floating point format, and the ISA associated with the one or more processors further comprises one or more additional instructions for extracting exponents from one or more other floating point formats.

In some aspects, the floating point value is zero, and the computing of the floor of the base two logarithm of the floating point value comprises returning negative one as the exponent.

In certain aspects the floating point value is infinity, and the computing of the floor of the base two logarithm of the floating point value comprises returning, as the exponent, a maximum positive word or half word value minus one.

In some aspects, the floating point value is a not a number (NaN) value, and the computing of the floor of the base two logarithm of the floating point value comprises returning, as the exponent, a maximum positive word or half word value.

Method 400 allows for an exponent to be extracted from a floating point value in a resource-efficient manner and in a way that accounts for variations in floating point type and normalization or non-normalization.

Example Processing System for Hardware-Based Floating Point Exponent Extraction

Figure 5:
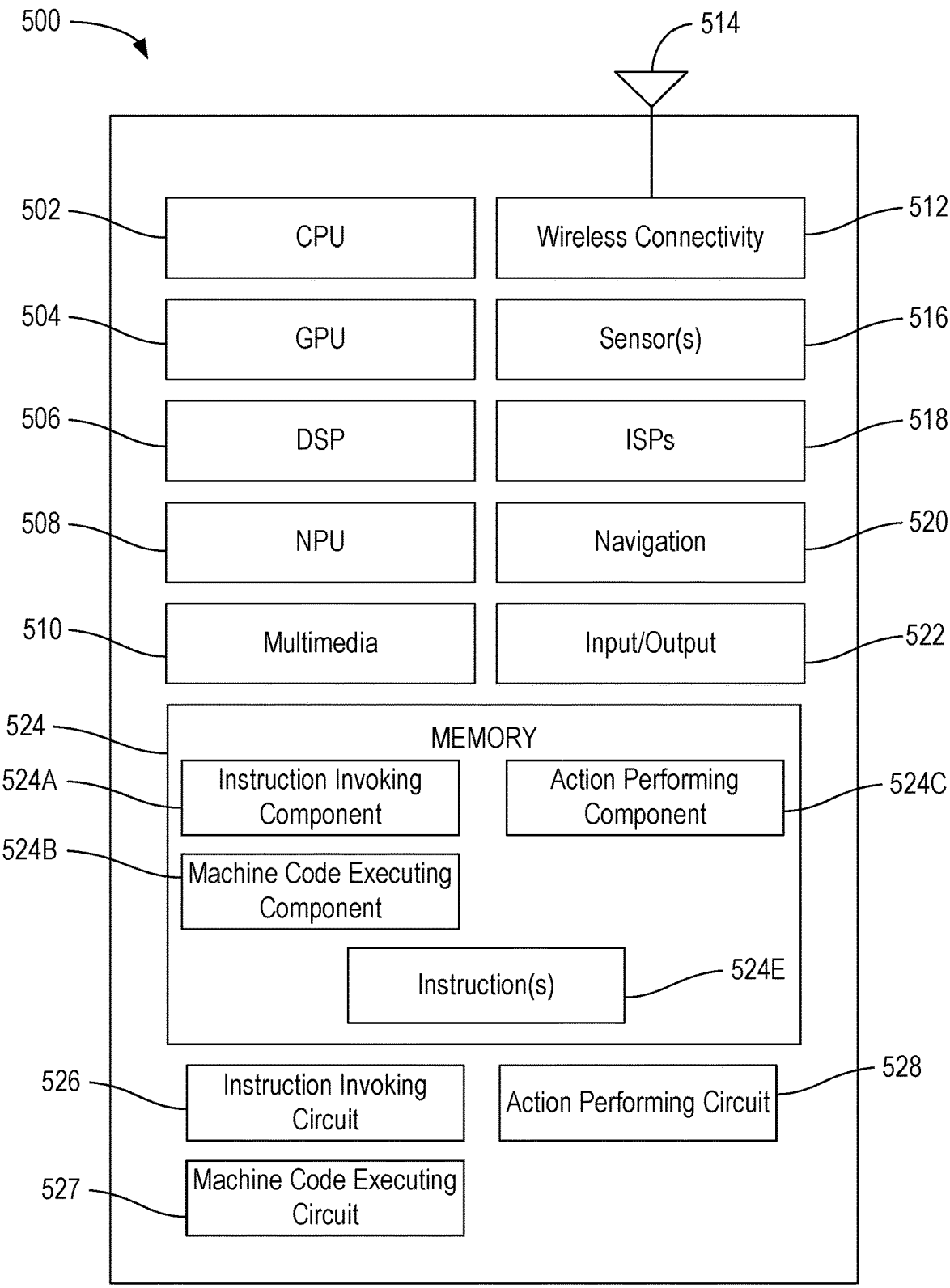
FIG. 5 depicts an example processing system configured to perform various aspects of the present disclosure.

In some aspects, the workflows, techniques, and methods described with reference to FIGS. 1-4 may be implemented on one or more devices or systems. FIG. 5 depicts an example processing system 500 configured to perform various aspects of the present disclosure, including, for example, the techniques and methods described with respect to FIGS. 1-4. In some aspects, the processing system 500 may correspond to processor 110 of FIG. 1. Although depicted as a single system for conceptual clarity, in some aspects, as discussed above, the operations described below with respect to the processing system 500 may be distributed across any number of devices or systems.

The processing system 500 includes a central processing unit (CPU) 502, which in some examples may be a multi-core CPU (e.g., corresponding to processor 110 of FIG. 1). Instructions executed at the CPU 502 may be loaded, for example, from a program memory associated with the CPU 502 or may be loaded from a memory partition (e.g., a partition of memory 524).

The processing system 500 also includes additional processing components tailored to specific functions, such as a graphics processing unit (GPU) 504, a digital signal processor (DSP) 506, a neural processing unit (NPU) 508, a multimedia component 510 (e.g., a multimedia processing unit), and a wireless connectivity component 512.

An NPU, such as NPU 508, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 508, are configured to accelerate the performance of common machine learning tasks, such as image classification, machine translation, object detection, and various other predictive models. In some examples, a plurality of NPUs may be instantiated on a single chip, such as a SoC, while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, the NPU 508 is a part of one or more of the CPU 502, the GPU 504, and/or the DSP 506.

In some examples, the wireless connectivity component 512 may include subcomponents, for example, for third generation (3G) connectivity, fourth generation (4G) connectivity (e.g., 4G Long-Term Evolution (LTE)), fifth generation connectivity (e.g., 5G or New Radio (NR)), Wi-Fi connectivity, Bluetooth connectivity, and/or other wireless data transmission standards. The wireless connectivity component 512 is further coupled to one or more antennas 514.

The processing system 500 may also include one or more sensor processing units 516 associated with any manner of sensor, one or more image signal processors (ISPs) 518 associated with any manner of image sensor, and/or a navigation processor 520, which may include satellite-based positioning system components (e.g., GPS or GLONASS), as well as inertial positioning system components.

The processing system 500 may also include one or more input and/or output devices 522, such as screens, touch-sensitive surfaces (including touch-sensitive displays), physical buttons, speakers, microphones, and the like.

In some examples, one or more of the processors of the processing system 500 may be based on an ARM or RISC-V instruction set.

The processing system 500 also includes the memory 524, which is representative of one or more static and/or dynamic memories, such as a dynamic random access memory, a flash-based static memory, and the like. In this example, the memory 524 includes computer-executable components, which may be executed by one or more of the aforementioned processors of the processing system 500.

In particular, in this example, the memory 524 includes an instruction invoking component 524A, a machine code executing component 524B, and an action performing component 524C. The memory 524 further includes one or more instructions 524E, which may be processor instructions that are part of an ISA, such as processor instruction 120 of FIG. 1, and which may be invoked by instruction invoking component 524A and/or executed by machine code executing component 524B Though depicted as discrete components for conceptual clarity in FIG. 5 the illustrated components (and others not depicted) may be collectively or individually implemented in various aspects.

The processing system 500 further comprises an instruction invoking circuit 526, a machine code executing circuit 527, and an action performing circuit 528. The depicted circuits, and others not depicted, may be configured to perform various aspects of the techniques described herein.

For example, the instruction invoking component 524A and/or the instruction invoking circuit 526 may be used to invoke an instruction 524E in order to extract an exponent from a floating point value at the hardware level, as discussed above with respect to FIGS. 1-4.

The machine code executing component 524B and/or the machine code executing circuit 527 may be used to execute machine code of an instruction 524E that is invoked by the instruction invoking component 524A and/or the instruction invoking circuit 526, as described above with respect to FIGS. 1-4, such as performing computation 200 of FIG. 2 and/or pipeline 300 of FIG. 3. The action performing component 524C and/or the action performing circuit 528 may be used to perform one or more actions using an exponent extracted as a result of executing machine code of an instruction by machine code executing component 524B and/or machine code executing circuit 527, as described above with respect to additional operation(s) 130 of FIG. 1. For example, the action performing component 524C and/or the action performing circuit 528 may perform one or more machine learning operations based on an exponent extracted from a vector that represents a feature processed by a machine learning model.

Though depicted as separate components and circuits for clarity in FIG. 5, the instruction invoking circuit 526, machine code executing circuit 527, and action performing circuit 528 may collectively or individually be implemented in other processing devices of the processing system 500, such as within the CPU 502, the GPU 504, the DSP 506, the NPU 508, and the like. For example, the instruction invoking circuit 526, machine code executing circuit 527, and action performing circuit 528 may be implemented via one or more instructions in an instruction set of the CPU 502, the GPU 504, the DSP 506, the NPU 508, or the like.

Generally, the processing system 500 and/or components thereof may be configured to perform the methods described herein.

Notably, in other aspects, elements of the processing system 500 may be omitted, such as where the processing system 500 is a server computer or the like. For example, the multimedia component 510, the wireless connectivity component 512, the sensor processing units 516, the ISPs 518, and/or the navigation processor 520 may be omitted in other aspects. Further, aspects of the processing system 500 may be distributed between multiple devices.

Example Clauses

Implementation examples are described in the following numbered clauses:

Clause 1: A processing system for hardware-based exponent extraction comprising: one or more memories comprising processor-executable instructions; and one or more processors configured to execute the processor-executable instructions and cause the processing system to: invoke an instruction in an instruction set architecture (ISA) associated with the one or more processors in order to extract an exponent from a floating point value; in response to the invoking, execute machine code of the instruction using the one or more processors to compute a floor of a base two logarithm of the floating point value to determine the exponent; and perform one or more actions using the exponent.

Clause 2: The processing system of Clause 1, wherein the computing of the floor of the base two logarithm of the floating point value comprises: determining a count of leading zeros in the floating point value; determining an indicated exponent value from the floating point value; and determining the exponent based on subtracting the count of leading zeros from the indicated exponent value.

Clause 3: The processing system of any one of Clause 1-2, wherein the computing of the floor of the base two logarithm of the floating point value comprises computing the floor of the base two logarithm of an absolute value of the floating point value.

Clause 4: The processing system of any one of Clause 1-3, wherein the floating point value is a component of a vector, and wherein the one or more processors are further configured to execute the processor-executable instructions and cause the processing system to invoke the instruction in the ISA associated with the one or more processors in order to extract respective exponents from respective floating point values that are other components of the vector.

Clause 5: The processing system of any one of Clause 1-4, wherein the exponent is a signed word or signed half word value depending on a bit width of the floating point value.

Clause 6: The processing system of any one of Clause 1-5, wherein the instruction corresponds to a particular floating point format, and wherein the ISA associated with the one or more processors further comprises one or more additional instructions for extracting exponents from one or more other floating point formats.

Clause 7: The processing system of any one of Clause 1-6, wherein the floating point value is zero, and wherein the computing of the floor of the base two logarithm of the floating point value comprises returning negative one as the exponent.

Clause 8: The processing system of any one of Clause 1-7, wherein the floating point value is infinity, and wherein the computing of the floor of the base two logarithm of the floating point value comprises returning, as the exponent, a maximum positive word or half word value minus one.

Clause 9: The processing system of any one of Clause 1-8, wherein the floating point value is a not a number (NaN) value, and wherein the computing of the floor of the base two logarithm of the floating point value comprises returning, as the exponent, a maximum positive word or half word value.

Clause 10: A method for hardware-based exponent extraction comprising: invoking an instruction in an instruction set architecture (ISA) associated with one or more processors in order to extract an exponent from a floating point value; in response to the invoking, executing machine code of the instruction using the one or more processors to compute a floor of a base two logarithm of the floating point value to determine the exponent; and performing one or more actions using the exponent.

Clause 11: The method of Clause 10, wherein the computing of the floor of the base two logarithm of the floating point value comprises: determining a count of leading zeros in the floating point value; determining an indicated exponent value from the floating point value; and determining the exponent based on subtracting the count of leading zeros from the indicated exponent value.

Clause 12: The method of any one of Clause 10-11, wherein the computing of the floor of the base two logarithm of the floating point value comprises computing the floor of the base two logarithm of an absolute value of the floating point value.

Clause 13: The method of any one of Clause 10-12, wherein the floating point value is a component of a vector, and wherein the method further comprises invoking the instruction in the ISA associated with the one or more processors in order to extract respective exponents from respective floating point values that are other components of the vector.

Clause 14: The method of any one of Clause 10-13, wherein the exponent is a signed word or signed half word value depending on a bit width of the floating point value.

Clause 15: The method of any one of Clause 10-14, wherein the instruction corresponds to a particular floating point format, and wherein the ISA associated with the one or more processors further comprises one or more additional instructions for extracting exponents from one or more other floating point formats.

Clause 16: The method of any one of Clause 10-15, wherein the floating point value is zero, and wherein the computing of the floor of the base two logarithm of the floating point value comprises returning negative one as the exponent.

Clause 17: The method of any one of Clause 10-16, wherein the floating point value is infinity, and wherein the computing of the floor of the base two logarithm of the floating point value comprises returning, as the exponent, a maximum positive word or half word value minus one.

Clause 18: The method of any one of Clause 10-17, wherein the floating point value is a not a number (NaN) value, and wherein the computing of the floor of the base two logarithm of the floating point value comprises returning, as the exponent, a maximum positive word or half word value.

Clause 19: An apparatus comprising: means for invoking an instruction in an instruction set architecture (ISA) associated with one or more processors in order to extract an exponent from a floating point value; means for, in response to the invoking, executing machine code of the instruction using the one or more processors to compute a floor of a base two logarithm of the floating point value to determine the exponent; and means for performing one or more actions using the exponent.

Clause 20: The apparatus of claim 19, wherein the computing of the floor of the base two logarithm of the floating point value comprises: determining a count of leading zeros in the floating point value; determining an indicated exponent value from the floating point value; and determining the exponent based on subtracting the count of leading zeros from the indicated exponent value.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system for hardware-based exponent extraction comprising:
   one or more memories comprising processor-executable instructions; and
   one or more processors configured to execute the processor-executable instructions and cause the processing system to:
      invoke an instruction in an instruction set architecture (ISA) associated with the one or more processors in order to extract an exponent from a floating point value;
      in response to the invoking, execute machine code of the instruction using the one or more processors to compute a floor of a base two logarithm of the floating point value to determine the exponent; and
      perform one or more actions using the exponent.

2. The processing system of claim 1, wherein the computing of the floor of the base two logarithm of the floating point value comprises:
   determining a count of leading zeros in the floating point value;
   determining an indicated exponent value from the floating point value; and
   determining the exponent based on subtracting the count of leading zeros from the indicated exponent value.

3. The processing system of claim 1, wherein the computing of the floor of the base two logarithm of the floating point value comprises computing the floor of the base two logarithm of an absolute value of the floating point value.

4. The processing system of claim 1, wherein the floating point value is a component of a vector, and wherein the one or more processors are further configured to execute the processor-executable instructions and cause the processing system to invoke the instruction in the ISA associated with the one or more processors in order to extract respective exponents from respective floating point values that are other components of the vector.

5. The processing system of claim 1, wherein the exponent is a signed word or signed half word value depending on a bit width of the floating point value.

6. The processing system of claim 1, wherein the instruction corresponds to a particular floating point format, and wherein the ISA associated with the one or more processors further comprises one or more additional instructions for extracting exponents from one or more other floating point formats.

7. The processing system of claim 1, wherein the floating point value is zero, and wherein the computing of the floor of the base two logarithm of the floating point value comprises returning negative one as the exponent.

8. The processing system of claim 1, wherein the floating point value is infinity, and wherein the computing of the floor of the base two logarithm of the floating point value comprises returning, as the exponent, a maximum positive word or half word value minus one.

9. The processing system of claim 1, wherein the floating point value is a not a number (NaN) value, and wherein the computing of the floor of the base two logarithm of the floating point value comprises returning, as the exponent, a maximum positive word or half word value.

10. A method for hardware-based exponent extraction comprising:
    invoking an instruction in an instruction set architecture (ISA) associated with one or more processors in order to extract an exponent from a floating point value;
    in response to the invoking, executing machine code of the instruction using the one or more processors to compute a floor of a base two logarithm of the floating point value to determine the exponent; and
    performing one or more actions using the exponent.

11. The method of claim 10, wherein the computing of the floor of the base two logarithm of the floating point value comprises:
    determining a count of leading zeros in the floating point value;
    determining an indicated exponent value from the floating point value; and
    determining the exponent based on subtracting the count of leading zeros from the indicated exponent value.

12. The method of claim 10, wherein the computing of the floor of the base two logarithm of the floating point value comprises computing the floor of the base two logarithm of an absolute value of the floating point value.

13. The method of claim 10, wherein the floating point value is a component of a vector, and wherein the method further comprises invoking the instruction in the ISA associated with the one or more processors in order to extract respective exponents from respective floating point values that are other components of the vector.

14. The method of claim 10, wherein the exponent is a signed word or signed half word value depending on a bit width of the floating point value.

15. The method of claim 10, wherein the instruction corresponds to a particular floating point format, and wherein the ISA associated with the one or more processors further comprises one or more additional instructions for extracting exponents from one or more other floating point formats.

16. The method of claim 10, wherein the floating point value is zero, and wherein the computing of the floor of the base two logarithm of the floating point value comprises returning negative one as the exponent.

17. The method of claim 10, wherein the floating point value is infinity, and wherein the computing of the floor of the base two logarithm of the floating point value comprises returning, as the exponent, a maximum positive word or half word value minus one.

18. The method of claim 10, wherein the floating point value is a not a number (NaN) value, and wherein the computing of the floor of the base two logarithm of the floating point value comprises returning, as the exponent, a maximum positive word or half word value.

19. An apparatus comprising:
- means for invoking an instruction in an instruction set architecture (ISA) associated with one or more processors in order to extract an exponent from a floating point value;
- means for, in response to the invoking, executing machine code of the instruction using the one or more processors to compute a floor of a base two logarithm of the floating point value to determine the exponent; and
- means for performing one or more actions using the exponent.

20. The apparatus of claim 19, wherein the computing of the floor of the base two logarithm of the floating point value comprises:
- determining a count of leading zeros in the floating point value;
- determining an indicated exponent value from the floating point value; and
- determining the exponent based on subtracting the count of leading zeros from the indicated exponent value.

* * * * *